April 23, 1940.  O. V. CEDERBERG  2,198,376
BEARING
Filed Dec. 17, 1937
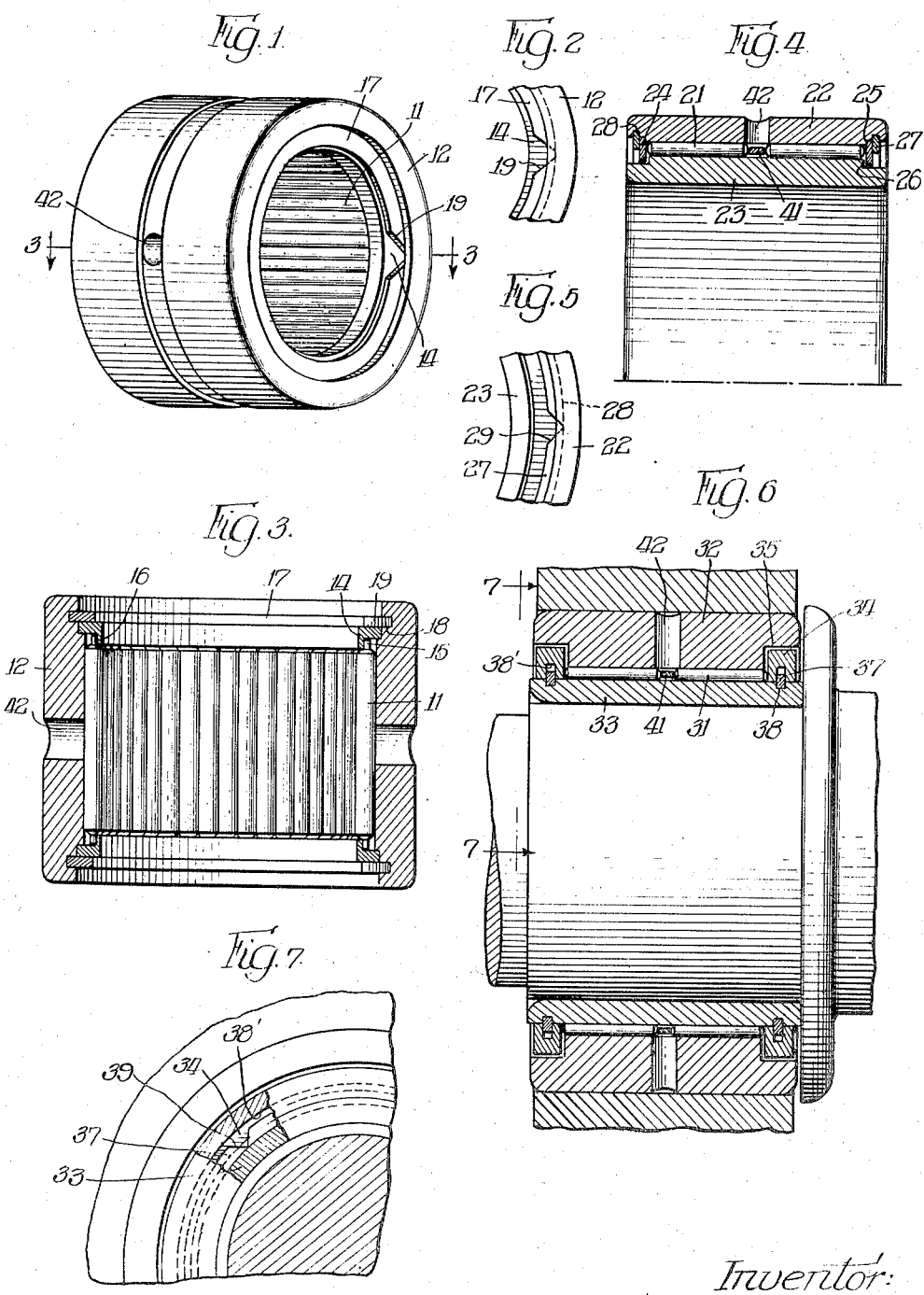
Inventor:
Olof V. Cederberg,
By Forman L. Mueller
atty.

Patented Apr. 23, 1940

2,198,376

UNITED STATES PATENT OFFICE 2,198,376

BEARING

Olof V. Cederberg, Valparaiso, Ind., assignor to McGill Manufacturing Company, Valparaiso, Ind., a corporation of Indiana Application December 17, 1937, Serial No. 180,415

2 Claims. (Cl. 308—212)

This invention relates to bearings and more particularly to antifriction bearings in which the rolling elements are permanently locked within the raceway to positively prevent tampering with them after the bearing assembly has been released by the manufacturer. The invention has been illustrated as embodied in different types of roller bearings in which a retaining ring at the ends of the rollers is held in place by a split ring so arranged that when it has once been applied, its removal will be either impossible or so extremely difficult as to dependably foil misguided attempts to remove it.

Movable parts on many types of mechanical apparatus require precision bearings for satisfactory operation and maximum efficiency of such apparatus. Although rugged and able to withstand enormous forces in their proper use, the movable parts of the bearings themselves, and particularly the rollers of roller bearings, must nevertheless be made with almost infinite accuracy. As a result, it is very undesirable to service such bearings by replacing parts thereof, such as the rollers or raceways, when they eventually become so worn that the operation and efficiency of the mechanical apparatus is impaired. However, mechanics are very often prone to attempt to disassemble such bearings to replace parts and in so doing prevent the proper functioning of the bearing thereafter, and in turn cause damage to the mechanical apparatus. Furthermore, when mechanics are unable to examine the rollers due to a closed inner raceway as will be described, they often attempt to disassemble a bearing in order to examine the inner elements. Accordingly, it is desirable that precision roller bearings be so constructed that the mechanic cannot possibly take them apart, and since such mechanics are sometimes quite ingenious and persistent this means that the bearing assembly must be so constructed that it is substantially impossible for anyone to take it apart.

Locking washers have previously been employed on bearings, but such washers have been of such construction as to be difficult to assemble, and as to necessitate corresponding, rather complicated and expensive structure in the bearing elements, so that such washers have not been entirely satisfactory.

According to the present invention a split locking ring is used. Such a ring can be applied much more easily than closed rings heretofore proposed, and may be less expensive in itself, and require less complicated corresponding structure on the bearing elements. Nevertheless, according to the present invention, these split rings are equally as safe against tampering. In one form of the invention the safety against tampering is provided by beveling the ends of the split ring so that it is impossible to get a tool between the ends in such a manner as to exert a prying leverage. In another form of the invention the split locking ring is completely concealed and inaccessible so that it is impossible to get any tool to the ring. When the ring is exposed, as in the first mentioned form, it is desirable that the ring used by a very stiff ring greatly expanded or contracted in its assembled position as a further safeguard against its removal. In other words, the ring should be of such nature that a very strong force is required to remove it, while its ends are of such shape or so concealed that such a force cannot be applied.

Additional features and objects of the invention will be apparent from the following description and from the drawing, in which:

Fig. 1 is a perspective view of one form of the invention chosen for illustration.

Fig. 2 is a fragmentary side elevation of the structure shown in Fig. 1, showing particularly the shape of the ends of the retaining ring and its relative position in the bearing.

Fig. 3 is a cross section taken on the line 3—3 of Fig. 1.

Fig. 4 is a cross-section view of a modified embodiment of my invention.

Fig. 5 is a fragmentary side elevation of the bearing of Fig. 4, similar to the showing of Fig. 2.

Fig. 6 is a fragmentary cross section of a further modified form of bearing, showing also its application to the trunnion of a shaft for which the bearing is provided.

Fig. 7 is a fragmentary side view of the bearing of Fig. 6 taken approximately on the line 7—7 of Fig. 6 and with a portion of the confining ring broken away to show the split retaining ring therein.

Although this invention may take numerous forms, only three have been chosen for illustration. In each of these forms the bearing includes a plurality of rollers 11, 21, or 31, and an outer raceway 12, 22, or 32. In the form of the invention shown in Figs. 4 to 7 there is also provided an inner raceway 23, or 33, forming part of the unitary bearing assembly. The term "raceway" is used as a convenient term for designating any casing or unit which includes the surface on which the rollers roll, even though this surface may be formed on an insert.

In the form of the invention shown in Figs. 1 to 3 the rollers 11 are retained in place by confining rings 14. It may be noted that the rollers 11 are provided with integral pin-like extensions 15 which are engaged by a flange 16 of the confining ring 14, although this construction is of only incidental interest in describing the present invention, the important consideration being that the ring 14 prevents removal of the rollers 11 so long as the ring 14 is in place.

According to the present invention the ring 14 is retained in place permanently by a split ring 17 which fits into a groove 18 in the outer raceway 12. The split ring 17 is initially oversize so that it must be contracted in order to be inserted within the raceway 12 with the result that it will spring into the annular groove 18.

The assembly of the bearing is of course extremely simple. After the rollers have been inserted and the confining ring is in place it is merely necessary to contract the split locking ring 17 with a suitable hand tool, thrust it within the raceway 12, and release it so that it may expand by its own resiliency into the annular groove 18.

In order to prevent removal of the locking ring 17 its ends are beveled as seen at 19 so that there is no surface on which a screw driver or other implement could catch to pry the ring out. The ring is so shaped that its peripheral surface will lie in contact with the outer raceway 12 at the ends of the ring so that it will be impossible to insert a tool under the end of the split ring 17. To this end it should also be a very stiff spring steel ring and initially considerably oversize so that it will expand against the raceway 12 with great force to more positively prevent the insertion of a sharply pointed tool under the end of the ring. When made of such strength, the points of the beveled ends of the rings may be blunted slightly as an element of personal safety without danger that the ring can be removed.

Fig. 3 shows the same retaining structure at both ends of the rollers but it should be understood that, if preferred, a retaining flange could be formed integrally with the raceway 12.

In Figs. 4 and 5 a full inner raceway 23 is provided. In the structure a closed confining ring 24 is positioned against the shoulder 25 of the outer race 22, and at a shoulder 26 of the inner race 23 to retain the rollers 21 in the bearing, and prevent removal thereof so long as the confining ring is held in place. This confining ring is held in place by a split ring 27 similar to that of Fig. 1. The ring 27 engages an annular slot or groove 28 in the outer raceway 22, deeper than the width of the shoulder 25 so that when expanded into locking position the ring 27 extends beyond the circumferential edge of the ring 24 similar to the structure of Fig. 1.

The assembly of this bearing construction is equally simple. After the rollers are in place between the outer raceway 22 and the inner raceway 23 the closed or confining ring 24 is positioned against the shoulders 25 and 26, and consequently against that end of the rollers. Thereafter, the split ring 27 is contracted to slip past the annular outer shoulder on the groove 28 until it springs into the groove 28 itself, in the outer raceway. The depth of this groove is such that the ring 27 extends beyond the groove and over the outer surface of the confining ring 24 far enough so that it effectively keys the confining ring 24 in place. The retaining ring 27 fits very snugly against the outer face of the confining ring 24 and by such fit and the inherent spring tension in the ring 27 itself, makes it impossible to insert any tool between the two rings to pry out the ring 27. As a safeguard to prevent the insertion of a tool between the split ends of the ring 27, such ring may be beveled at its ends as seen at 29 so that a tool can get no purchase against an end, nor in a wedging action between the ends, eventually pry out an end of the retaining ring and thus remove the entire member. The bevel should be at such an angle that a tool pressing against the same will simply slide off such end rather than force such end out of the groove, or when applied directly to the two ends will simply jam rather than spread the ends of the ring apart. Likewise, the ring 27 may be made initially sufficiently stiff so that a great deal of force will be necessary to expand it under any circumstances. In other words, both the rings of Figs. 1 to 3 and the rings of Figs. 4 and 5 may be in a state of high elastic tension so that a great deal of force, even if it could be applied, would be necessary to remove them.

A still further modification is illustrated in Figs. 6 and 7. A full outer raceway 32, and a full inner raceway 33, similar to the corresponding elements of the structure of Fig. 4 are employed to support the rollers 31. In the present structure, however, a relatively large confining ring 34 is positioned adjacent a shoulder 35 of the outer raceway and fits snugly to the peripheral surface of the inner raceway as shown in Fig. 6.

The confining ring 34 is locked in place and consequently the rollers 31 are positively retained in the bearing, by means of a split locking or retaining ring 37. Similarly to the assembly described above, the rollers 31 are first assembled in the raceways. The locking ring 37 is then contracted sufficiently to be pushed over the inner surface of the confining ring 34 until it drops into the groove or channel 38' in said confining ring. This assembly is then moved up to the outer edge of the inner raceway and the locking ring 37 expanded into the groove 38' so that it may be pressed over the surface of the inner raceway until it reaches the channel 38 in the inner raceway. The split ring automatically contracts and springs into the channel 38, securely and irremovably locking the confining ring 34 in place. If the ring 34 is snug on the inner raceway there is substantially no possibility of getting to the retaining ring 37. However, this ring may be similarly beveled at its ends as shown at 39 in Fig. 7.

It is understood that in all of the embodiments of my invention as shown, the confining and retaining or locking ring assembly is the same on each side of the bearings.

In the bearings of Figs. 4 to 7 inclusive an inner spacer 41 is provided, although the width of the bearing may be such that a single roller will be acceptable, in which case of course the spacer is omitted. An oil hole such as 42 is shown in all of the embodiments.

From the foregoing it is seen that an antifriction bearing assembly has been provided in which the bearings are permanently retained in place so that tampering is absolutely prevented and there is no danger of the extreme precision with which the bearing assembly is manufactured being altered by tampering or attempted repairs. At the same time the retaining means is very inexpensive and very easily applied.

The disclosures of this application are illustrative and the invention is not to be limited by them. In fact, if modifications or improvements are not at once obvious, they may be devised in the course of time to make additional use of the broad ideas taught and covered by this application. The claims are intended to point out novel features and not to limit the invention except as may be required by prior art.

I claim:

1. An antifriction bearing assembly including in combination a raceway carrying a plurality of rolling elements therein, a confining member for preventing movement of the rolling elements is an axial direction out of the raceway, said raceway having an annular flange of substantially the same depth throughout its length, and means for substantially permanently retaining said rolling elements in the raceway comprising a split ring sprung behind said annular flange in a position between said confining member and said flange, said split ring having its periphery protected by said flange and having its ends of such a configuration as to form a substantially V-shaped recess at said ends with the apex of the "V" at the base of the flange, with the depth of the flange being such in combination with said ring-end configuration and said ring seating behind said flange so that it will be substantially impossible to insert a tool beneath an end of the ring to move said end from behind said flange.

2. An antifriction bearing assembly including in combination a raceway carrying a plurality of rolling elements therein, said raceway including an annular groove of substantially the same depth throughout its length, with the outside axial limits of said groove defined by an annular flange of substantially the same height throughout its length, a confining member within said raceway intermediate said groove and said rolling elements for retaining the rolling elements in said raceway, and means for substantially preventing removal of said confining member, said means comprising a split ring sprung into said groove to lie in a position behind said annular flange so that the periphery of the ring is protected by said flange, with the ends of said ring each being beveled to a substantially sharp point on the periphery of said ring, and with said points seated in the bottom of said annular groove, with the points of said ends being substantially together and forming a substantially V-shaped recess at said ends, with the bevel of each of said ends being such, and the ring fitting in said groove so that it is substantially impossible to insert a tool in said groove beneath an end of the ring to pry said end out of said groove and remove the ring therefrom.

OLOF V. CEDERBERG.